(12) United States Patent
Kokojima (10) Patent No.: US 7,821,514 B2
(45) Date of Patent: Oct. 26, 2010

(54) IMAGE PROCESSING APPARATUS, IMAGE PROCESSING METHOD, AND IMAGE PROCESSING PROGRAM

(75) Inventor: Yoshiyuki Kokojima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 11/687,831

(22) Filed: Mar. 19, 2007

(65) Prior Publication Data

US 2007/0263926 A1    Nov. 15, 2007

(30) Foreign Application Priority Data

May 11, 2006 (JP) ............................. 2006-132726

(51) Int. Cl.
*G06T 11/00* (2006.01)
(52) U.S. Cl. ...................................... 345/470
(58) Field of Classification Search ................. 345/470
See application file for complete search history.

(56) References Cited

U.S. PATENT DOCUMENTS

| | | | | |
|---|---|---|---|---|
| 4,901,251 | A * | 2/1990 | Sfarti | 345/441 |
| 7,239,319 | B2 * | 7/2007 | Loop | 345/467 |
| 2003/0016221 | A1 | 1/2003 | Long et al. | |
| 2004/0257607 | A1 | 12/2004 | Gupta et al. | |

FOREIGN PATENT DOCUMENTS

| JP | 6-168339 | 6/1994 |
|---|---|---|
| JP | 7-72847 | 3/1995 |
| JP | 11-288261 | 10/1999 |
| JP | 2006-66274 | 3/2006 |

OTHER PUBLICATIONS

Loop, Charles, and Jim Blinn. "Rendering Vector Art on the GPU." Ed. Hubert Nguyen. GPU Gems 3. Upper Saddle River [etc.: Addison-Wesley, Dec. 2007. pp. 543-560.*
U.S. Appl. No. 11/535,277, filed Sep. 26, 2006, Yoshiyuki Kokojima.
Charles Loop, et al., "Resolution Independent Curve Rendering using Programmable Graphics Hardware", Microsoft Research, 2005, 10 Pages.
Charles Loop, et al., "Resolution Independent Curve Rendering using Programmable Graphics Hardware", Microsoft Research, 2005, 10 pages.

* cited by examiner

*Primary Examiner*—Xiao M Wu
*Assistant Examiner*—Scott E Sonners
(74) *Attorney, Agent, or Firm*—Oblon, Spivak, McClelland, Maier & Neustadt, L.L.P.

(57) ABSTRACT

An image processing apparatus includes, a first data generation unit configured to generate triangular data by analyzing straight line contours and curved contours with respect to vector format graphic data and making the straight line contours and the curved contours triangles, a second data generation unit configured to generate stencil data from the triangular data on the basis of a drawing order of vertices of the triangular data generated from straight line contours and curved contours, and a third data generation unit configured to generate raster format graphic data with reference to the stencil data.

9 Claims, 9 Drawing Sheets

IMAGE PROCESSING APPARATUS, IMAGE PROCESSING METHOD, AND IMAGE PROCESSING PROGRAM

CROSS-REFERENCE TO RELATED APPLICATIONS

This application is based upon and claims the benefit of priority from prior Japanese Patent Application No. 2006-132726, filed May 11, 2006, the entire contents of which are incorporated herein by reference.

BACKGROUND OF THE INVENTION

1. Field of the Invention

The invention relates to a drawing technology such as an image processing apparatus, image processing method and image processing program, particularly to for generating raster format graphic data from vector format graphic data.

2. Description of the Background Art

Images configured by combining geometric graphics primitives such as points, straight lines, curves, rectangles, and ellipses are called vector graphics. On the other hand, images configured by arrays of points (pixels or dots) are called raster graphics.

Generally, images which are displayed on displays or are printed by printers are raster graphics. Therefore, when vector graphics are handled by these devices, processing for transforming those into raster graphics (i.e., rasterizing) is required. The processing cost of rasterizing is high, and a high-performance computer is required for rasterizing complicated vector graphics.

Because proper-resolution raster graphics can be generated every time vector graphics are displayed, there is no case in which the image qualities of contours and the like are deteriorated due to enlargement, reduction, and deformation of images. For this reason, artificial images such as illustrations and drawings, whose contours are clear, are handled as vector graphics in many cases. On the other hand, natural images such as photographs are handled as raster graphics in many cases.

As the most familiar example of the utility of vector graphics, fonts have been known. In early personal computers (hereinafter referred to as "PC"), raster format fonts (bitmap fonts) have been used due to the restrictions on the CPU performances. However, in bitmap fonts, it is necessary to store font data at each resolution, and thus, a large quantity of storage capacity is required.

In accordance with improvement in subsequent CPU performances, current PCs can display high-quality fonts with a less storage capacity in such a manner that vector format font (outline font) data independent of resolution are stored in advance, and fonts at appropriate resolution corresponding to a display or a printer are generated in each case. However, CPUs built into mobile telephones, car navigation systems, or the like have relatively low processing capacities. Hence, there has been an object that arithmetic costs required for rasterizing vector graphics are reduced.

In recent years, graphics processing units (GPUs) have been used in order to achieve the above object. In a rasterizing technique using the GPU, a curve is approximated by using a plurality of triangles. For this reason, when raster graphics are enlarged, the raster graphics have the rough looks. Because it is necessary to improve the approximate accuracy of a curve by using a large number of triangles in order to smoothly rasterize vector graphics, the increases in the storage capacity and the processing cost are inevitable.

To solve these problems, a reference (C. Loop and J. Blinn, Resolution Independent Curve Rendering using Programmable Graphics Hardware, SIGGRAPH 2005) proposes the method which can rasterise the curve always smoothly without depending on the resolution by processing a curve part of the vector graphics for each pixel near the curve not a triangular unit. Since neither the memory capacity nor the processing cost depend on the resolution in this technique, neither the memory capacity nor the processing cost increase.

The reference discloses an even-odd rule as the rasterise method. Here, two kinds of rules such as an even-odd rule and a non-zero rule are widely known as a filling rule when the figure of the vector format is rasterised.

The even-odd rule is as follows: a half-line is drawn from an arbitrary point of in closed region aiming at an arbitrary direction in each closed region inside the figure. The closed region is filled only when the number that the half-lines and contours of the figure intersect is odd number.

On the other hand, in the non-zero rule, a half-line is drawn from an arbitrary point in the closed region aiming at an arbitrary direction in each closed region in the figure, and the counter is incremented and/or decremented according to the direction where the contour of the figure intersects the half-line. For example, when the contour of the figure intersects the half-line from the left to the right for traveling direction of the half-line, the counter is incremented (+1), and when the contour thereof intersects the half-line from the right to the left, the counter is decremented (−1). Increment or decrement of the counter is performed as mentioned above for all intersections of the half-lines and the contours of the figure. As a result, only when the value of the counter is not 0, the closed region is filled.

In a simple figure, the filling result based on these two kinds of rules of the even-odd rule and non-zero rule becomes equal. However, the filling result might be different in a figure which includes the self-intersection and includes a different figure inside thereof (for example, a figure having a hole).

BRIEF SUMMARY OF THE INVENTION

An image processing apparatus according to an aspect of the invention is characterized by comprising: a first data generation unit configured to generate triangular data by analyzing straight line contours and curved contours with respect to vector format graphic data and making the straight line contours and the curved contours triangles; a second data generation unit configured to generate stencil data from the triangular data on the basis of a drawing order of vertices of the triangular data generated from straight line contours and curved contours; and a third data generation unit configured to generate raster format graphic data with reference to the stencil data. The invention is not limited to only the invention of the apparatus as mentioned above, and may be applied to an invention of the method or the computer readable program.

DETAILED DESCRIPTION OF THE INVENTION

Embodiments will be described with reference to the drawings.

Figure 1:
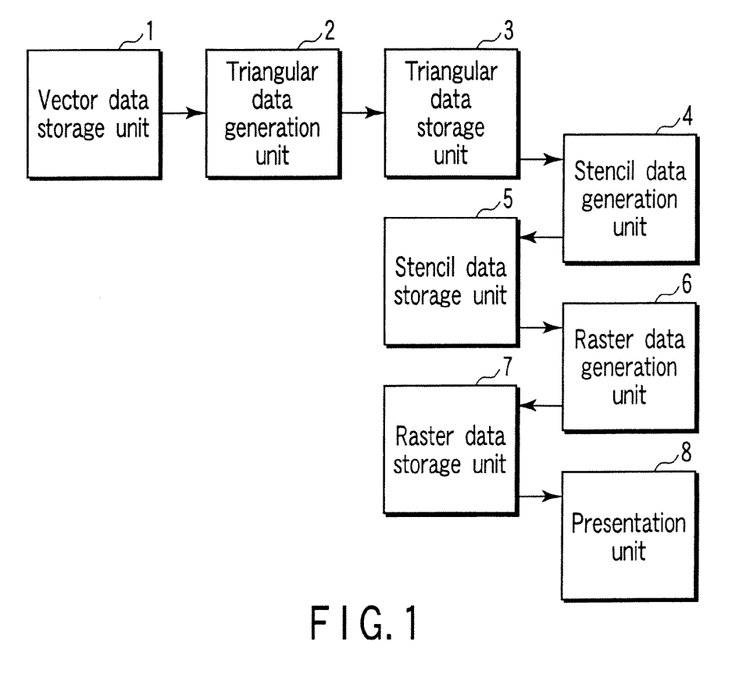
FIG. 1 is a block diagram showing a schematic configuration of an image processing apparatus according to a first embodiment.

The apparatus in an embodiment comprises a vector data storage unit 1, a triangular data generation unit 2, a triangular data storage unit 3, a stencil data generation unit 4, a stencil data storage unit 5, a raster data generation unit 6, a raster data storage unit 7, and a presentation unit 8. A data flow with respect to each block is also shown in FIG. 1. In the above-mentioned configuration, the vector data storage unit 1 and the triangular data generation unit 2 are served as a function of a CPU, and the triangular data storage unit 3 to the raster data storage unit 7 are served as a function of a GPU. The presentation unit 8 is served as a function of a display device.

The vector data storage unit 1 stores vector format graphic data.

The triangular data generation unit 2 reads the vector format graphic data (Hereafter, it may be called as a "vector data") stored in the vector data storage unit 1, and generates triangular data as will be described later in detail.

The triangular data storage unit 3 stores the triangular data generated by the triangular data generation unit 2.

The stencil data generation unit 4 reads the triangular data stored in the triangular data storage unit 3, and generates stencil data.

The stencil data storage unit 5 stores the stencil data generated by the stencil data generation unit 4.

The raster data generation unit 6 generates raster format data (Hereinafter, it may be called as a "raster data") with reference to the stencil data stored in the stencil data storage unit 5 as will be described later in detail.

The raster data storage unit 7 stores the raster data generated by the raster data generation unit 6.

The presentation unit 8 presents the raster data stored in the raster data storage unit 7.

In FIG. 1, the vector data storage unit 1, the triangular data storage unit 3, the stencil data storage unit 5, and the raster data storage unit 7 are described as different blocks. These storage units may be configured on a single memory, or may be configured separately on a plurality of different memories.

Figure 2:
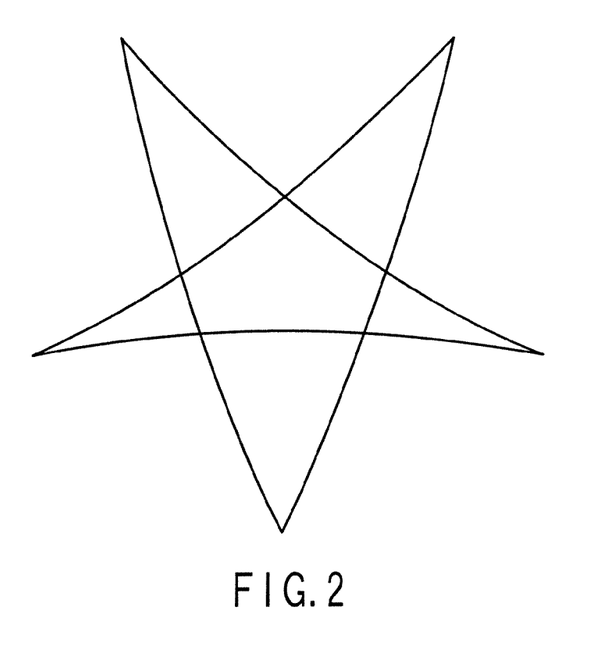
FIG. 2 is a view showing one example of a vector format graphic.

Hereinafter, when the vector graphics including the self-intersection and the parameter curve shown in FIG. 2 are rasterised to the raster graphics, a detailed operation (processing) of each block of the apparatus of FIG. 1 and the data structure which flows between blocks will be explained in reference to the flowchart shown in FIG. 3.

[Vector Data Storage Unit 1]

Figure 4:
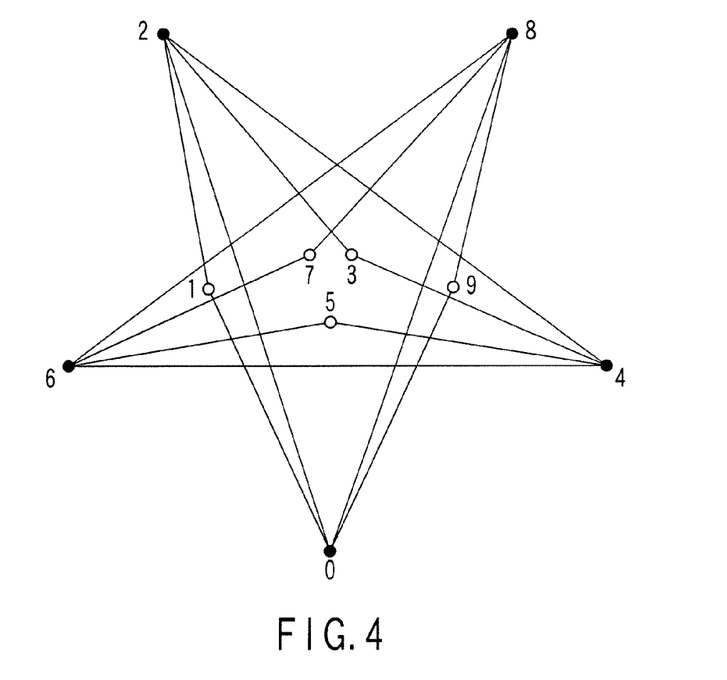
FIG. 4 is a view showing one example of vector data.

The vector data storage unit 1 stores vector data to be rasterized. As described in FIG. 4, the vector data is composed of types of graphics primitives, coordinates of respective points configuring the graphics primitives, connecting relationship among the points, and the like. For example, the vector data of the graphic of FIG. 2 is configured by the points and the straight lines as shown in FIG. 4. In FIG. 4, the end-points of the straight lines or the parameter lines are expressed by black points, and the control points of the parameter curves are expressed by white points. In the first embodiment, suppose that the vector data as shown in FIG. 4 has been already stored in the vector data storage unit 1. The vector data is not limited to the format described above, and may include other data generally utilized in the field of computer graphics.

[Triangular Data Generation Unit 2]

Figure 3:
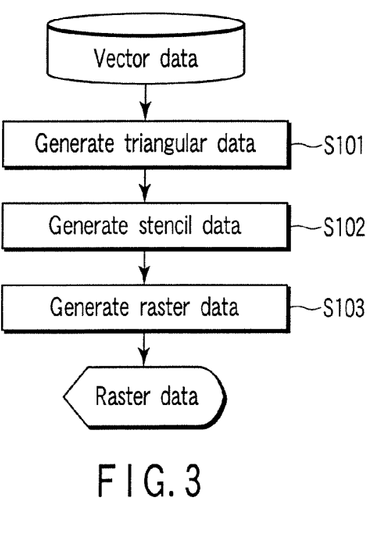
FIG. 3 is a flowchart showing the procedure according to the embodiment.
Figure 5:
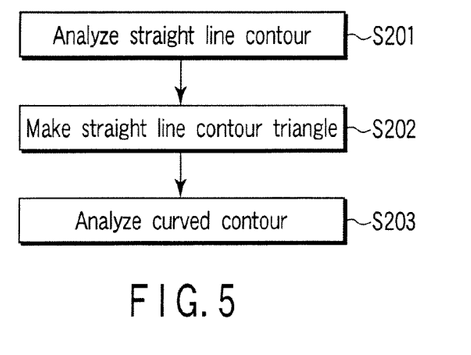
FIG. 5 is a flowchart showing a procedure of processes of a triangular data generation unit 2 in the embodiment.

The vector data shown in FIG. 4 which is stored in the vector data storage unit 1 is read by the triangular data generation unit 2 (step S101 of FIG. 3). The triangular data generation unit 2 generates the triangular data by analyzing an contour of the read vector data according to the flowchart of FIG. 5.

Figures 6, 7, 8:
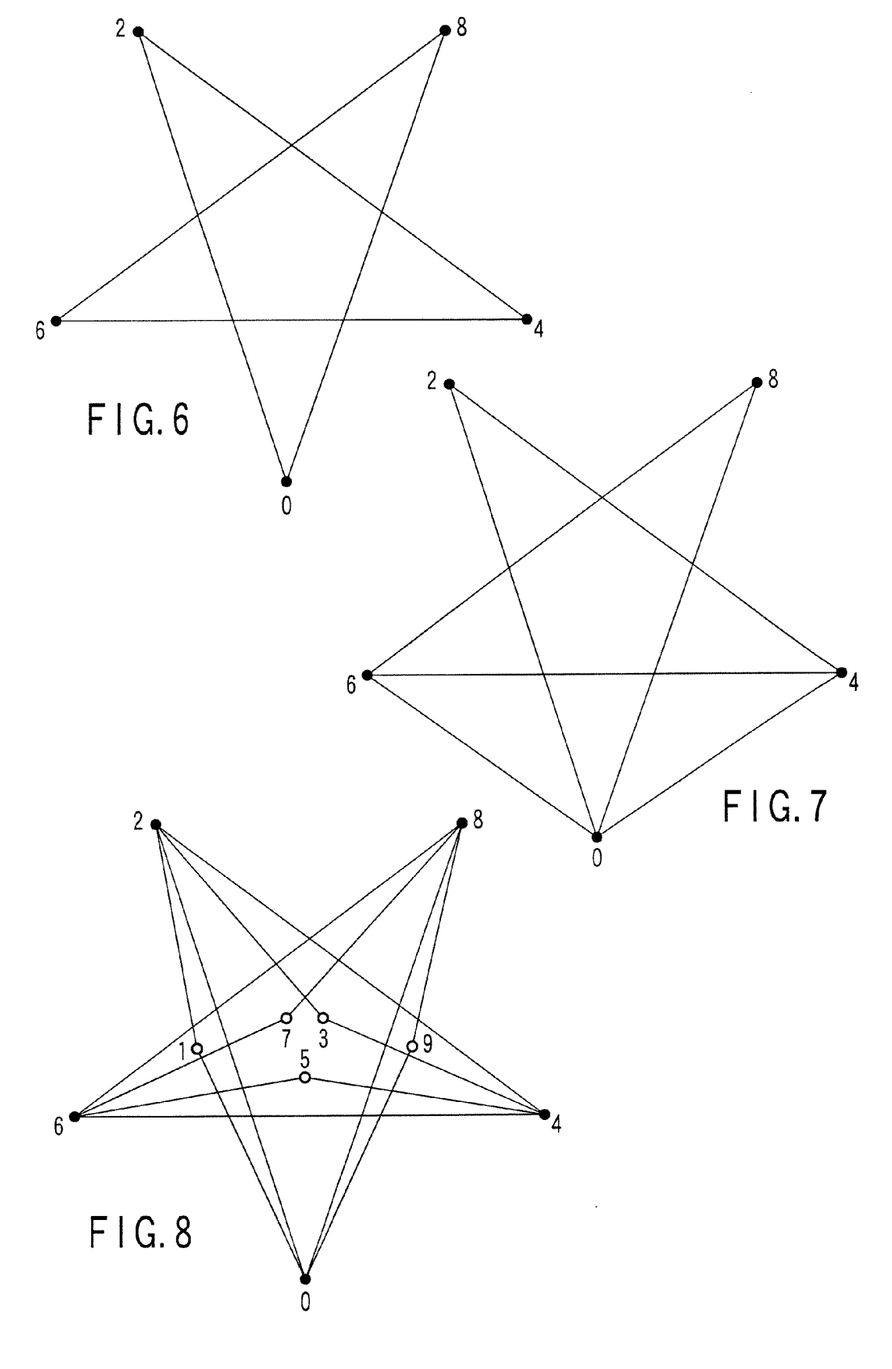
FIG. 6 is a view showing an example of the straight line contours in the embodiment.
FIG. 7 is a view showing an example of triangular data generated from the straight line contours in the embodiment.
FIG. 8 is a view showing an example of straight line contours and curved contours in the embodiment.

The triangular data generation unit 2 analyzes straight line contours of the vector data (step S201). The straight line contours configure a polygon which is obtained by connecting a starting point and an end point of the straight line and the curve included in the vector data by the segment as shown in FIG. 6 ignoring the control point. The polygon configured by the straight line contour is not limited to one. The polygon may include a self-intersection and a hole.

Next, making the straight line contours triangles is performed (step S202). Specifically, first, an arbitrary vertex among the plurality of vertices of the respective polygons configuring the straight line contours obtained in step S201 is selected (in this specification, this point is referred to as "pivot"). Then, a plurality of triangles with the pivot being as one vertex are generated such that the pivot and all the other vertices are connected with straight lines, and two vertices coupled to each other become a side of one triangle. The two vertices coupled to each other mean two vertices connected with a side of a polygon.

For example, in FIG. 6, three triangles formed by connecting points 0-2-4, points 0-4-6, and points 0-6-8 in each order are generated as shown in FIG. 7, if the point 0 is selected as a pivot.

And, the curved contours of the vector data are analyzed (step S203). In this processing, the curved contours is a group of the triangles in which three points of the starting point and the end point of the parameter curve and the control point are connected as shown in FIG. 8. The vector data of FIG. 4 and the curved contours of FIG. 8 are completely the same in this example, but these are different data generally. The curved contours of FIG. 8 are configured from five triangles formed by connecting points 0-1-2, points 2-3-4, points 4-5-6, points 6-7-8, and points 8-9-0 in each order.

Figure 9A:
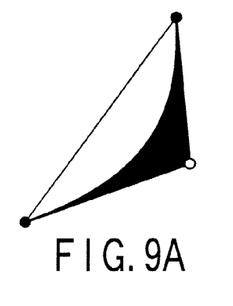
FIG. 9A and FIG. 9B are views showing examples of convex curved contours and concave curved contours in the embodiment.
Figure 9B:
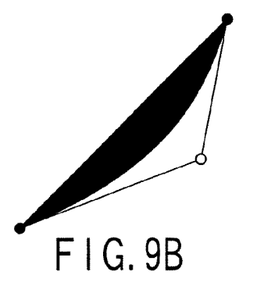

Here, curved contours is classified into two kinds of curved contours shown in FIG. 9A and FIG. 9B. In FIG. 9A, a concave region of the curve is inside the figure (Hereafter, it is called as a "concave curved contour"), and in FIG. 9B, a convex region of the curve is inside the figure (Hereafter, it is called as a "convex curved contour").

The triangular data of the straight line contours (FIG. 7) and the triangular data of the curved contours (FIG. 8) generated with the above-mentioned procedure is output from the triangular data generation unit 2 and is stored to the triangular data storage unit 3.

In the above procedure, the triangles may be generated at the same time when analyzing the straight line contours, by carrying out the processing of step S201 and step 202 concurrently. The triangular data is configured from a position coordinate of three points which configures each triangular, texture coordinates, and connection relationship, etc. However, the triangular data configuration is not limited to this format, but may include other data which is used in the field of the graphics, generally.

[Stencil Data Generation Unit 4]

In the flowchart of FIG. 3, when the triangular data is generated, the stencil data is generated with stencil data generation unit 4 (step S102). In this case, the triangular data held in the triangular data storage unit 3 is read by the stencil data generation unit 4. Then, the stencil data generation unit 4 generates the stencil data by rasterising the read pixel inside the triangle.

This stencil data is an image data with the same resolution as the resolution finally presented in the presentation unit 8. The stencil data is held in the stencil data storage unit 5. Moreover, the numerical value having about several bits is assigned to each pixel of the stencil data, and is initialized by 0 before all image processing for every frame.

The stencil data generation unit 4 reads and rasterises the triangular data of the straight line contours (FIG. 7) and the triangular data of the curved contours (FIG. 8) from the triangular data storage unit 3. At this time, all pixels inside each triangle are rasterised as for the triangle of the straight line contours.

Rasterising based on the even-odd rule is described in the reference document. In the embodiment, to achieve rasterising based on the non-zero rule, the pixel value included in the triangle drawn in clockwise (hereinafter, it is called as a "clockwise triangle") is incremented (+1) and the pixel value included in the triangle drawn in anti-clockwise (hereinafter, it is called as a "anti-clockwise triangle") is decremented (−1) among pixels rasterised by the stencil data generation unit 4.

In this case, the clockwise triangle means a triangle that the three vectors in which the vertices are sequentially connected form a clockwise loop among each triangle projected to the projection plane. On the other hand, the triangle that forms an anti-clockwise loop on the projection plane is called as the anti-clockwise triangle. In this case, it is assumed that the direction of the vector is decided in the order of defining the vertices which are shown by the numerical order as shown in FIG. 4.

The pixel value is not limited to +1 and −1 in the case of clockwise and anti-clockwise. The pixel value of a part which is not filled may be set to 0 or a predetermined value.

Figure 10:
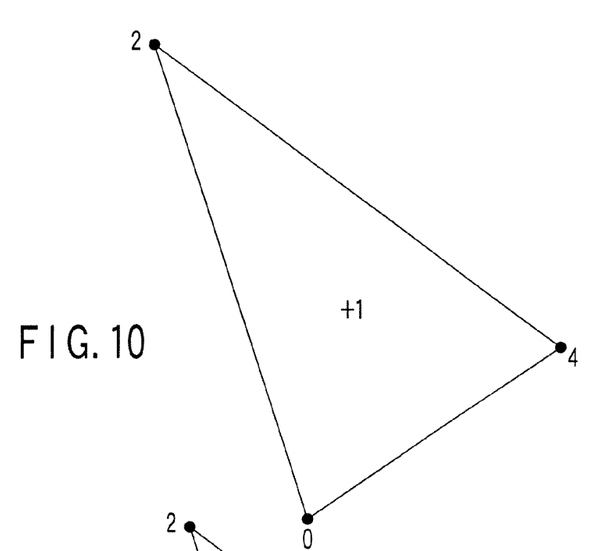
FIG. 10 is a view showing an example of the stencil data generated with the triangle of straight line contours in the embodiment.
Figure 11:
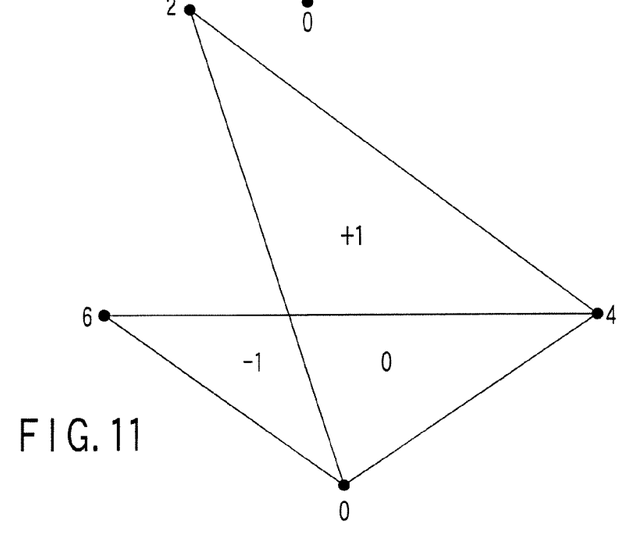
FIG. 11 is a view showing an example of the stencil data generated with the triangle of straight line contours in the embodiment.
Figure 12:
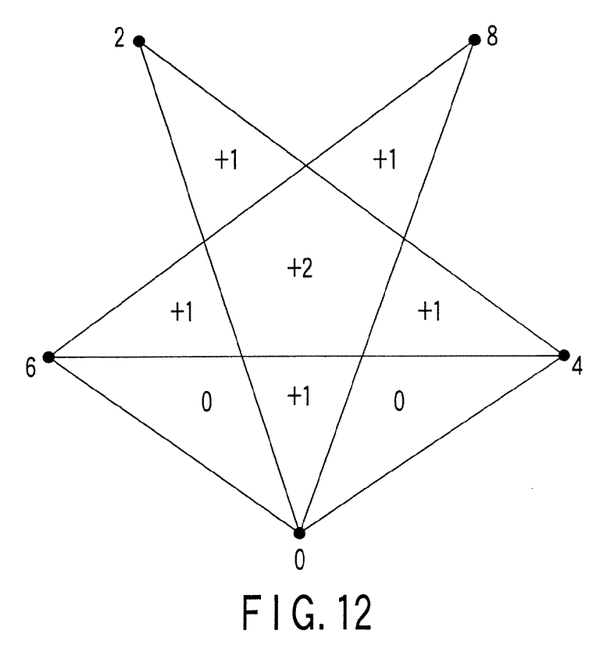
FIG. 12 is a view showing an example of the stencil data generated with the triangle of straight line contours in the embodiment.

According to the setting as described above, the triangle formed by sequentially connecting points 0-2-4 is a clockwise triangle among three triangles of FIG. 7. Therefore, for example, as shown in FIG. 10, the pixel value of the stencil data included inside of this triangular is incremented and becomes +1. On the other hand, since the triangle formed by sequentially connecting point 0-4-6 shown in FIG. 7 is anti-clockwise, as shown in FIG. 11, the pixel value included inside of this triangular is decremented and becomes −1. Therefore, the pixel value in the overlapped part of the triangle formed by sequentially connecting points 0-2-4 and the triangle formed by sequentially connecting point 0-4-6 becomes 0. Moreover, since the triangle formed by sequentially connecting points 0-6-8 is clockwise, as shown in FIG. 12, the pixel value included inside of this triangular is incremented and becomes +1. In this case, a value of an overlapped part of the triangle formed by sequentially connecting points 0-6-8, the triangle formed by sequentially connecting points 0-2-4, and the triangle formed by sequentially connecting points 0-4-6 is set to a value by adding the pixel values set by each triangle.

On the other hand, only a pixel which belongs to the convex region of the curve is rasterised among pixels inside the triangular about the triangle of the curved contour. Then, as well as the case of the straight line contours, the pixel value included in a clockwise triangle is incremented (+1), and the pixel value included in an anti-clockwise triangle is decremented (−1) among pixels which belong to the convex region of the curve rasterised by the stencil data generation unit 4.

Figure 13:
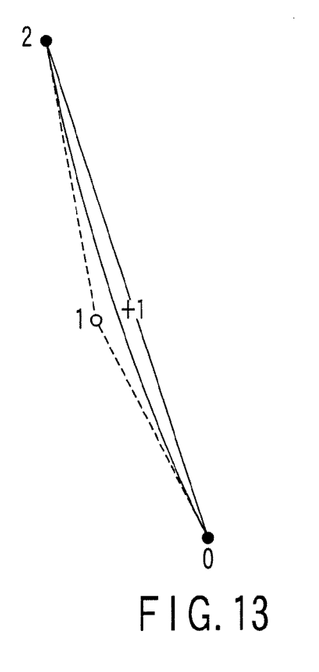
FIG. 13 is a view showing an example of the stencil data generated with the triangle of curved contours in the embodiment.
Figure 14:
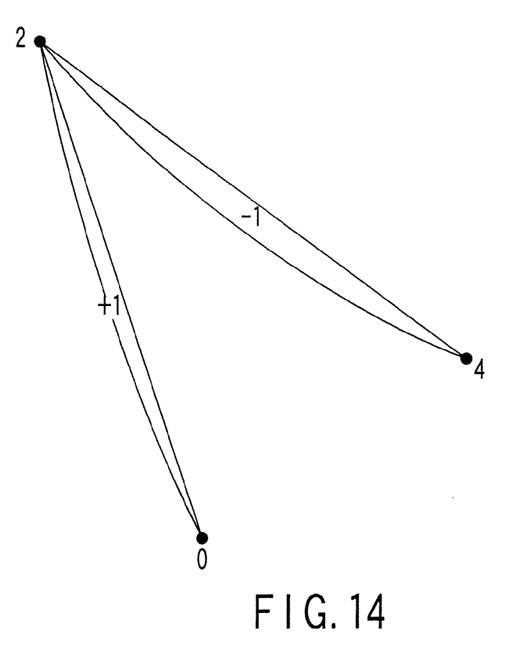
FIG. 14 is a view showing an example of the stencil data generated with the triangle of curved contours in the embodiment.

For example, among five triangles shown in FIG. 8, since the triangle which is connected in order of points 0-1-2 is a clockwise triangle as shown in FIG. 13, the pixel value of the stencil data included in the convex region of the triangular is incremented and becomes +1. Similarly, when drawing the triangles by connecting points 2-3-4, points 4-5-6, points 6-7-8, and points 8-9-0 in each order, the pixel value of the stencil data is updated as shown in FIG. 14, FIG. 15, FIG. 16, and FIG. 17, etc. The control points of the curve contours (point shown with white point in FIG. 8) are omitted in FIG. 14 to FIG. 17.

Figures 15, 16, 17:
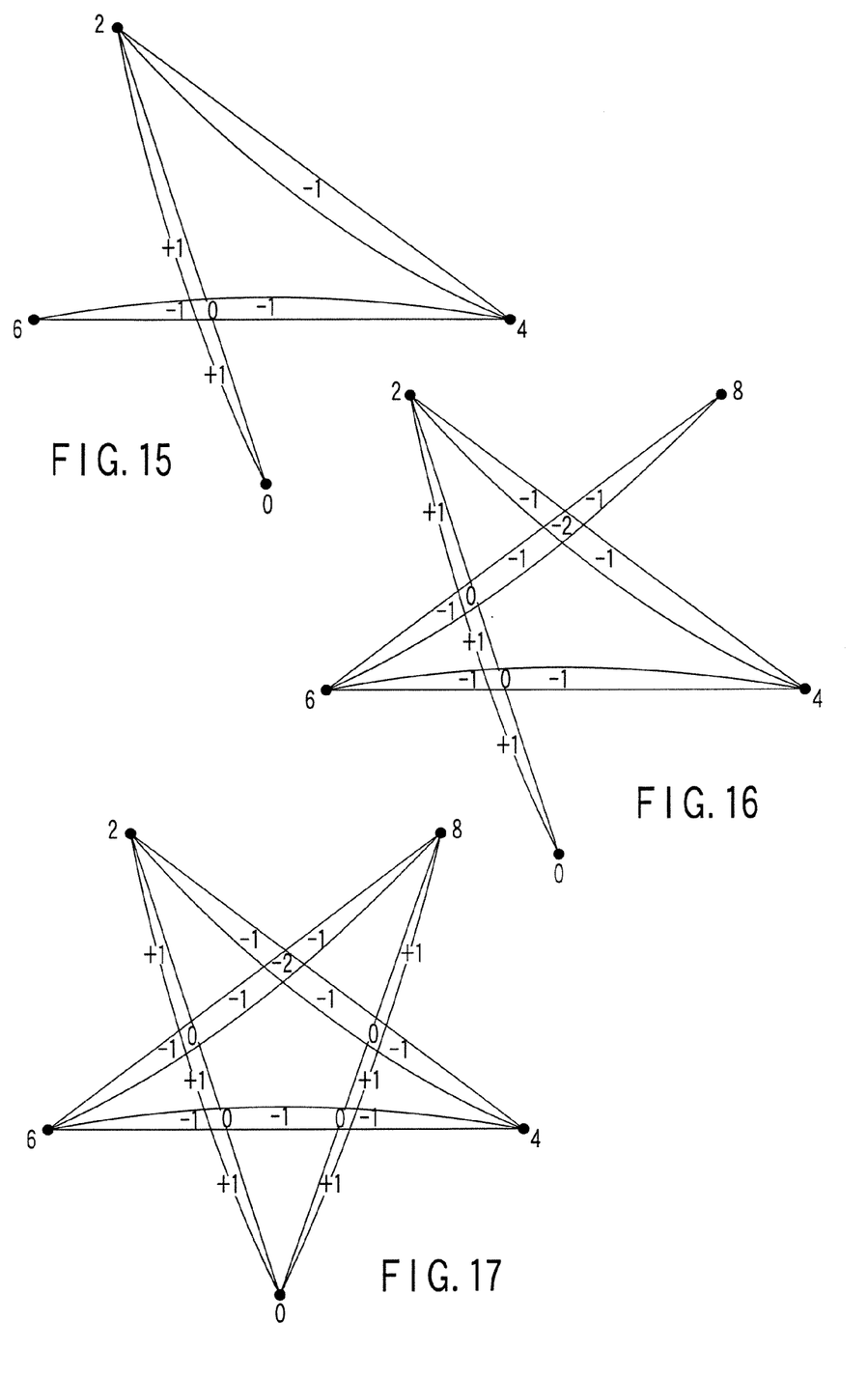
FIG. 15 is a view showing an example of the stencil data generated with the triangle of curved contours in the embodiment.
FIG. 16 is a view showing an example of the stencil data generated with the triangle of curved contours in the embodiment.
FIG. 17 is a view showing an example of the stencil data generated with the triangle of curved contours in the embodiment.
Figure 18:
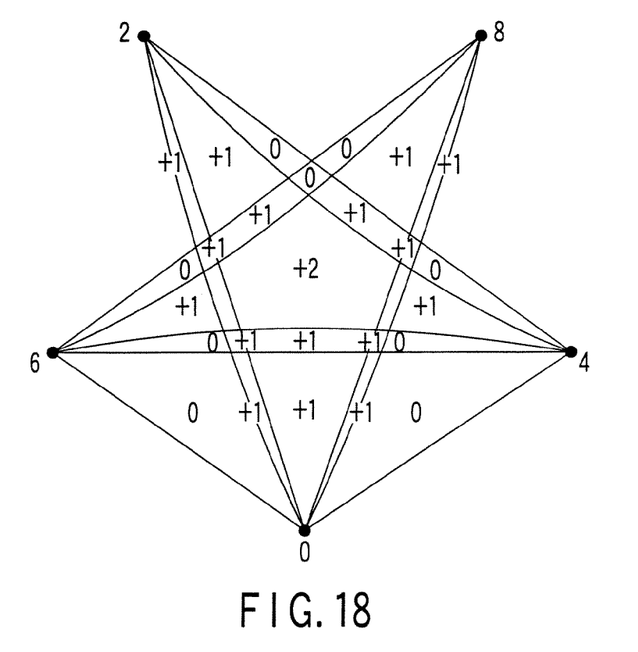
FIG. 18 is a view showing an example of the stencil data generated in the embodiment.

Then, when the rasterised result of the triangle of the straight line contours shown in FIG. 12 and the rasterised result of the triangle of the curve contours shown in FIG. 17 are added, the stencil data shown in FIG. 18 is finally obtained.

Figure 19:
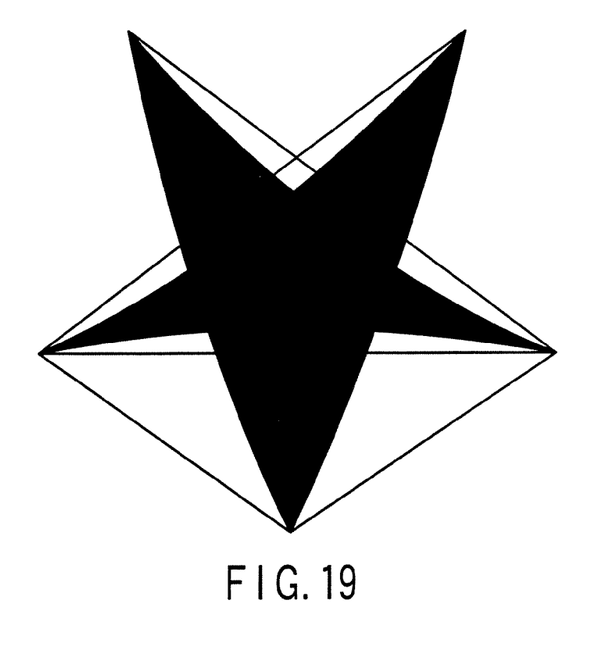
FIG. 19 is a view showing an example of visualizing the stencil data generated in the embodiment.

FIG. 19 is a figure which is visualized by filling the pixel having the value of non-zero by black and filling the pixel having the value of 0 by gray among pixels of the stencil data of FIG. 18. Among pixels of the stencil data of FIG. 19, the pixel value to be filled on the basis of the non-zero rule is other than 0 and the pixel value not to be filled is 0 in the figure of the vector format show in FIG. 2.

There is no order dependent in processing of rasterizing the triangular data. In FIG. 10 to FIG. 17, first, the triangular data of the straight line contours is sequentially rasterised, then, the triangular data of the curve contours is sequentially rasterised separately, and rasterised result shown in FIG. 18 is obtained by adding those results. The above mentioned explanation is performed to understand the embodiment well, and all triangles of FIG. 10 to FIG. 17 may be rasterized in the arbitrary order.

The stencil data (FIG. 18) generated with the stencil data generation unit 4 is written and held in the stencil data storage unit 5.

As described above, the stencil data is image data having the same resolution as that finally presented to the presentation unit 8. However, the configuration of the stencil data is not limited to this format, and may include other data generally utilized in the field of computer graphics.

[Raster Data Generation Unit 6]

The raster data generation unit 6 generates raster data such that only areas whose pixel values are numeric values other than zero (the areas filled with black in FIG. 19) are rasterized with reference to the stencil data stored in the stencil data storage unit 5.

The raster data is image data having the same resolution as that finally presented to the presentation unit 8, and is stored in the raster data storage unit 7. Numeric values of about several bits are assigned to the respective pixels of the raster data for each of a plurality of color components (for example, RGBA).

Figure 20A:
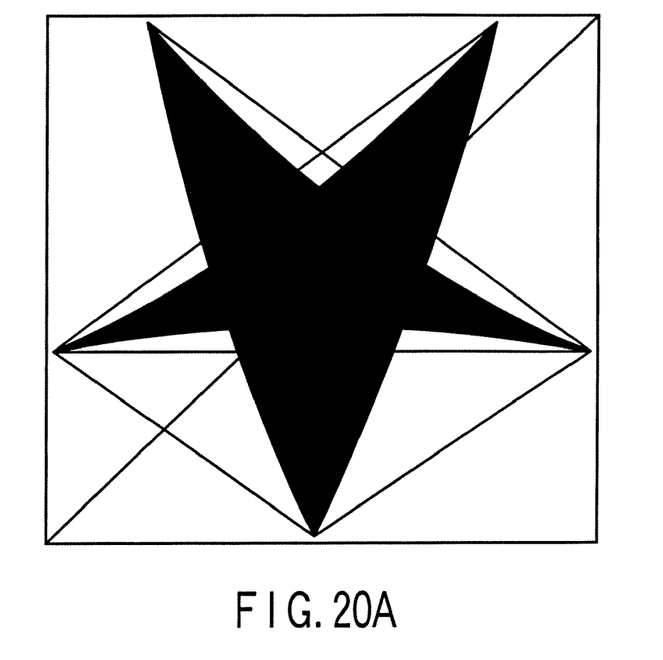
FIG. 20A and FIG. 20B are views showing an example of generating the raster data in the embodiment.
Figure 20B:
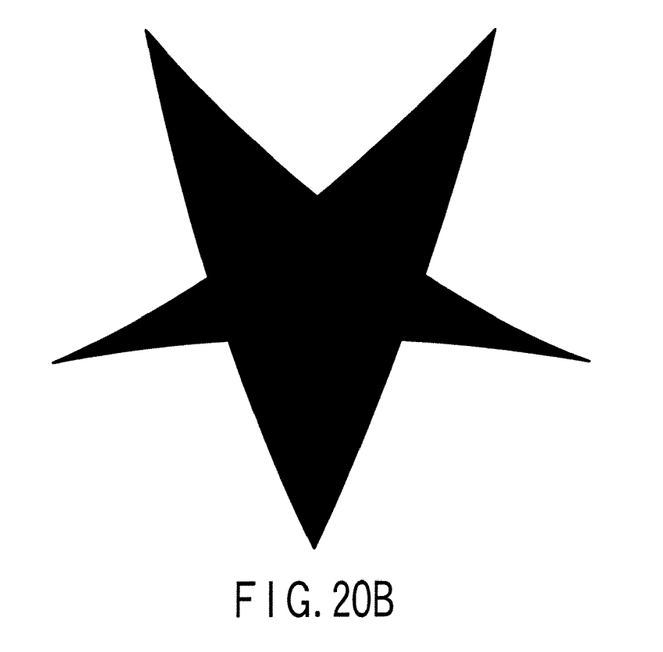

As shown in FIG. 20A, the raster data generation unit 6 rasterizes all the pixels at the inside of the two triangles covering the entire graphics. However, pixels which will be actually written into the raster data storage unit 7 among these pixels are limited to areas at which pixel values of corresponding stencil data are numeric values other than zero (the areas filled with black in FIG. 20A). As a result, raster data as shown in FIG. 20B are written into the raster data storage unit 7.

As described above, the raster data is image data having the same resolution as that finally presented to the presentation unit 8. However, the configuration of the raster data is not limited to this format, and may include other data generally utilized in the field of computer graphics.

[Presentation Unit 8]

The presentation unit 8 is configured by a display, a printer, or the like for presenting the raster data held in the raster data storage unit 7 to a user.

As mentioned above, according to the embodiment, the figure including the self-intersection can be rasterised on the basis of the non-zero rule. The figure including the self-intersection is exemplified in the above-mentioned embodiment, but the figure which includes a different figure inside thereof (for example, figure having the hole) can be rasterises on the basis of the non-zero rule similarly.

In the above-mentioned embodiment, as the examples of the curve contours, the figure including the secondary parameter curve is described as an example, but it is similarly applicable also in the tertiary parameter curve. The explanation thereof will be performed simply.

Figure 21:
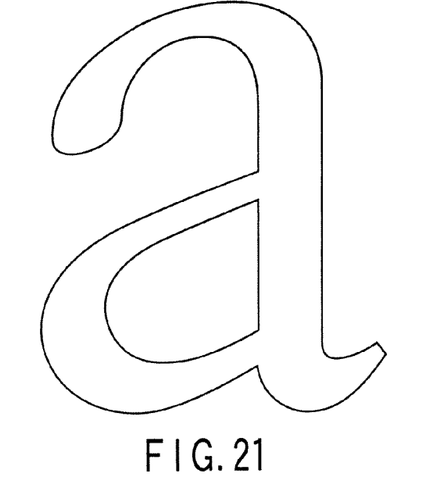
FIG. 21 is a view showing an example of the figure including the tertiary parameter curve.
Figure 22:
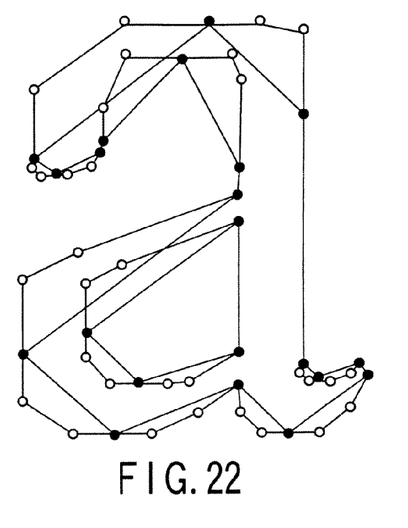
FIG. 22 is a view showing an example of straight line contours and curved contours in FIG. 21.

The figure shown in FIG. 21 is assumed to be stored in the vector data storage unit 1 as the vector data shown in FIG. 22.

Figure 23A:
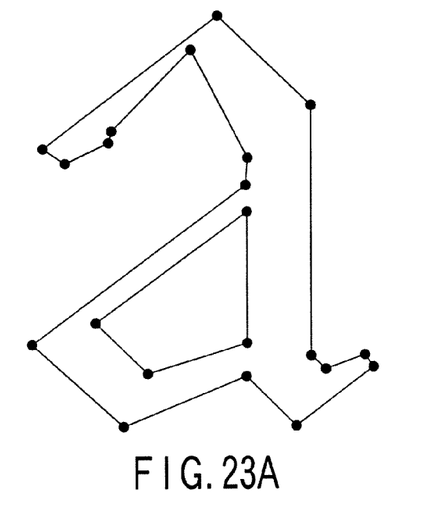
FIG. 23A and FIG. 23B are views showing an example of a convex curved contour and a concave curved contour in FIG. 21.
Figure 23B:
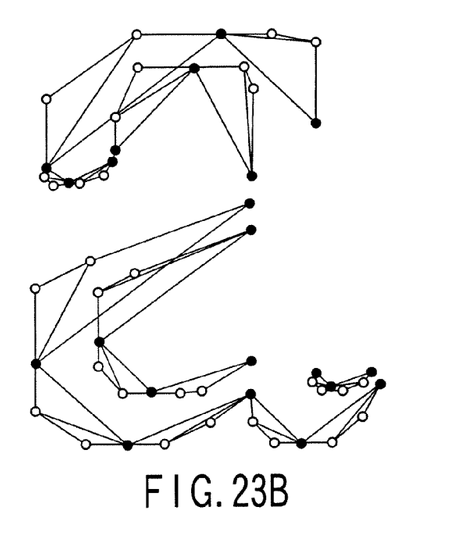
Figure 24A:
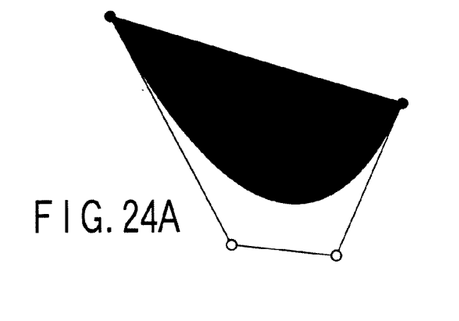
FIG. 24A and FIG. 24B are views showing an example of curved contours in the tertiary parameter curve.
Figure 24B:
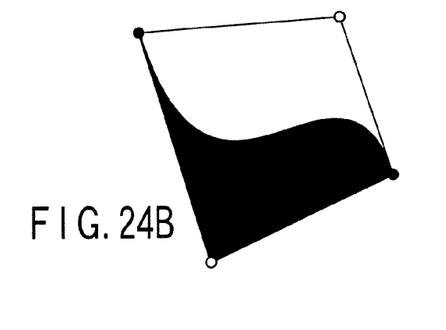

The triangular data generation unit 2 analyzes the vector data shown in FIG. 22 and generates the straight line contours shown in FIG. 23A and the curved contours shown in FIG. 23B as mentioned above. In this case, the end point of the straight line or the parameter curve of the figure is indicated by the black points, and the control point of the parameter curve is indicated by the white points. There are two control points of the parameter curve for the end points of the parameter curve, and the triangle may be formed so as to connect one of the control points and the end points located at a direction of the opposing corners. The tertiary parameter curve may be a curve having not only the curve shown in FIG. 24A but also the inflection point shown in FIG. 24B.

For example, in the above-mentioned embodiment, a case where the raster format graphic data of the character is generated from the vector format graphic data is described. When other figure, for instance, the map data are given by the vector format, the present invention can also be applied to when the raster format graphic data is generated from the map data.

According to the present invention, it becomes possible to rasterise the figure including the self-intersection and the figure including a different figure internally (for example, the figure having hole) on the basis of the non-zero rule, and the pretreatment cost can be greatly reduced.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus comprising:
a first data generation unit configured to generate triangular data which includes first triangular data generated by analyzing straight line contours with respect to vector format graphic data and second triangular data generated by analyzing curved contours with respect to the vector format graphic data;
a second data generation unit configured to generate stencil data from the triangular data by determining a numerical value for separate enclosed regions formed within each of the first triangular data and the second triangular data on the basis of a drawing order of vertices of the first triangular data and the second triangular data, and by determining regions of the triangular data to be included in the stencil data which correspond to specified numerical values obtained by overlapping the first triangular data with the second triangular data and adding together the numerical values determined for the first triangular data with the numerical values determined for the second triangular data, wherein numerical values for overlapping regions of the first triangular data and the second triangular data are added together; and
a third data generation unit configured to generate raster format graphic data with reference to the stencil data,
wherein the straight line contours define a configuration of a polygon which is obtained by ignoring a control point of each curve contour and connecting starting points and end points of a straight line and curve of each straight line contour, and the curved contours are a group of the triangles in which three points of a starting point, end point and control point of a parameter curve of each curved contour are connected.

2. The apparatus according to claim 1, further comprising:
a first storage unit configured to store the vector format graphic data;
a second storage unit configured to store the triangular data generated by the first data generation unit;
a third storage unit configured to store the stencil data generated by the second data generation unit; and a fourth storage unit configured to store the raster format graphic data generated by the third data generation unit.

3. The apparatus according to claim 2, further comprising a presentation unit configured to present the raster format graphic data.

4. The apparatus according to claim 1, wherein the first data generation unit generates at least one polygon by analyzing the straight line contours of the vector format graphic data, and generates a plurality of triangles with respect to each polygon in such a manner that one vertex of the polygon is made to be a common vertex of triangles, the common vertex and all other vertices are connected with straight lines, and two vertices coupled to each other become a side of one triangle.

5. The apparatus according to claim 1, wherein the second data generation unit determines a respective numerical value by adding a first value to a pixel value inside the triangular data when a drawing order of the vertices is clockwise, and adding a second value different from the first value to a pixel value inside the first triangular data when a drawing order of the vertices is anti-clockwise.

6. The apparatus according to claim 5, wherein, when the triangular data is a triangle which indicates the curved contours, the first value is added to a pixel value which belongs to a clockwise triangular convex area, and the second value is added to a pixel value which belongs to an anti-clockwise triangular convex area.

7. The apparatus according to claim 5, wherein the first value is +1, and the second value is −1.

8. The apparatus according to claim 1, wherein the curve defined by the curved contours is a secondary parameter curves or tertiary parameter curves.

9. A computer-implemented method of image processing comprising the operations, performed by a computer, of:
generating, at the computer, triangular data which includes first triangular data generated by analyzing straight line contours with respect to vector format graphic data and second triangular data generated by analyzing curved contours with respect to the vector format graphic data;
generating, at the computer, a stencil data from the triangular data by determining a numerical value for separate enclosed regions formed within each of the first triangular data and the second triangular data on the basis of a drawing order of the vertices of the first triangular data and the second triangular data, and by determining regions of the triangular data to be included in the stencil data which correspond to specified numerical values obtained by overlapping the first triangular data with the second triangular data and adding together the numerical values determined for the first triangular data with the numerical valued determined for the second triangular data, wherein numerical values for overlapping regions of the first triangular data and the second triangular data are added together; and
generating, at the computer, raster format graphic data referring to the stencil data,
wherein the straight line contours define a configuration of a polygon which is obtained by ignoring a control point of each curve contour and connecting starting points and end points of a straight line and curve of each straight line contour, and the curved contours are a group of the triangles in which three points of a starting point, end point and control point of a parameter curve of each curved contour are connected.

* * * * *